Figure 1:
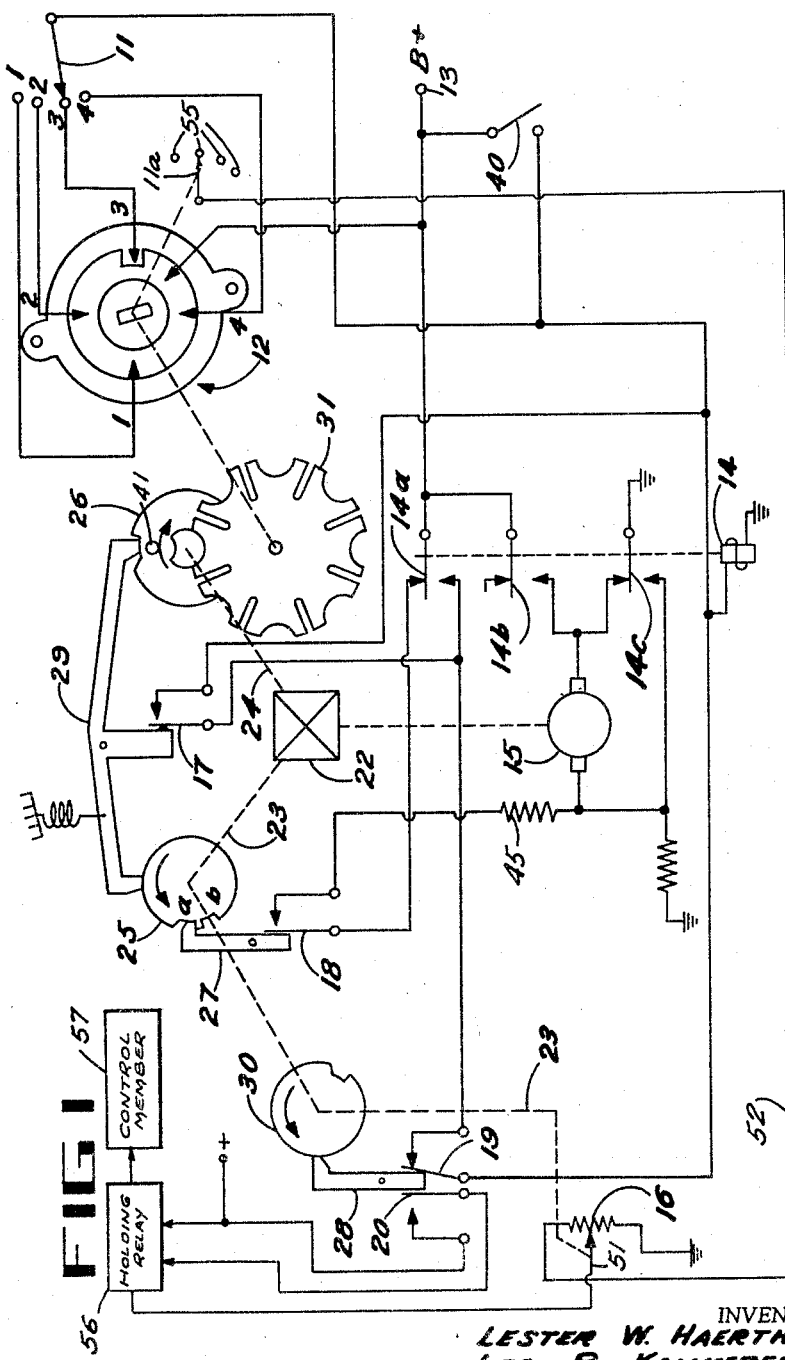

April 26, 1960 L. W. HAERTHER ET AL 2,934,688
FADER AND SWITCHING UNIT MOTOR CONTROL SYSTEM
Filed July 24, 1957 2 Sheets-Sheet 2

INVENTORS
LESTER W. HAERTHER
LEO P. KAMMERER
BY
Moody and Harsha
ATTORNEYS

United States Patent Office 2,934,688
Patented Apr. 26, 1960

2,934,688

FADER AND SWITCHING UNIT MOTOR CONTROL SYSTEM

Lester W. Haerther and Leo P. Kammerer, Cedar Rapids, Iowa, assignors to Collins Radio Company, Cedar Rapids, Iowa, a corporation of Iowa Application July 24, 1957, Serial No. 673,981

6 Claims. (Cl. 318—286)

This invention relates to a novel fading and switching unit where a predetermined fading function occurs as a result of each switch movement.

It is desirable in automatic flight control systems to reduce the gain of signals being applied to control channels during certain switching functions. For example, autopilot systems include a plurality of operational modes wherein for each selected mode of operation a discretely unique combination of control signals is provided to operate the aileron, rudder, and elevator channels. Automatic flight control systems additionally might include means whereby the control signals for the various control surfaces might be selectively engaged such that the pilot may elect to fly manually or, by operation of an engaging control, elect to fly automatically using the automatic flight control system signals to operate the aircraft's controls. Means must be incorporated in automatic flight control systems such that upon changing the operational mode or upon engaging the system to automatic control from a condition of manual control, the subsequent application of control signals does not result in erratic flight operation due to switching transients or to the abrupt application of an extreme command signal for a certain function. Smooth flight operation may be experienced if provisions are incorporated in automatic flight control systems whereby the gain in the control surface channels is reduced to zero during the time that operational modes are changed or automatic engagement is desired. The present invention provides a novel switching and fading arrangement which might be incorporated in an automatic flight control system wherein, upon engagement of the system from manual to automatic control in a given operation mode or upon selection of a different operation mode, an automatic sequence is initiated whereby sequentially the gain of the control surface channels is faded to zero, the resulting control surface signals are operably connected to the related control surface channels, and the gain of the channels faded back to normal. With such an arrangement switching transients occur during the time of reduced channel gain and the newly selected control signal is not abruptly applied to the aircraft control channels but is gradually applied so as to assure a smooth transition in the flight control.

It is an object of this invention to provide a novel switching unit for function switching which will be extremely accurate and yet be of a minimum size. It is another object of this invention to provide a fading means which is automatically operated each time a predetermined switch combination is energized. It is another object of this invention to provide a selector switching system which will automatically change the gain of a control signal to zero and run the gain up after the switching has been performed.

Figure 2:
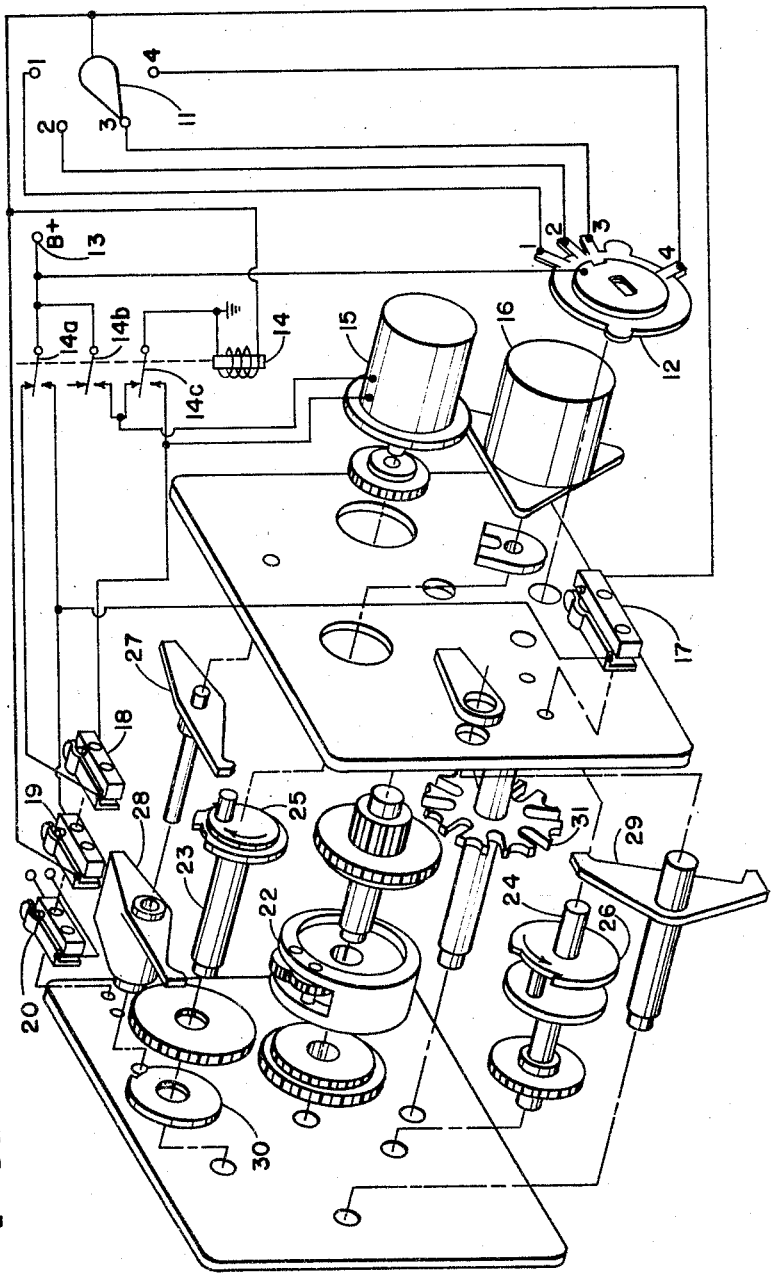

These and other objects of this invention will become apparent when the following description is read in conjunction with the accompanying drawings, Figure 1 of which is a functional electro-mechanical and schematic representation of this invention, and Figure 2 of which is a combination exploded mechanical and schematic representation of a physical embodiment of this invention wherein like elements are similarly referenced.

With reference to Figure 1, the function selector switch 11 is shown in the number three position. This switch is shown as having four positions but any number of positions would be possible depending upon the number of channels or control signals which it is desired to select. This switch is rotatable and may be positioned at any one of a plurality of selectable positions. Additionally, there is a seeking switch 12 having individual contacts connected to individual contacts on said selector switch. There is a source of direct current voltage 13 which is selectively connected through the seeking switch 12 and the selection switch 11 to the relay 14. The relay 14 has a plurality of movable contacts 14a, 14b and 14c associated therewith. There are also a plurality of fixed contacts. The motor 15 is normally a direct current motor and is normally reversible. There is a potentiometer 16 which is connected to external sources and varies the signal applied to the control surfaces as the resistance of the potentiometer 16 is varied. There are also a plurality of movable switch elements which are actuated normally by pawls, these switch elements being switches 17, 18, 19 and 20. Switch 20 is connected to an external circuit, to be further described, which provides for the delay of the engagement for a predetermined time. The operation of this switch is a part of this invention and therefore the switch itself is included in the drawing. The mechanical arrangement of this switching and fading unit includes the differential gear 22 and a plurality of unnumbered gears which are driven by the differential and in turn drive the shafts 23 and 24. The shafts 23 and 24 have a plurality of cams including cam 25 and cam 26 attached and rotated thereon. There are a plurality of pawls, some of these pawls being spring operated. These pawls include pawls 27, 28 and 29. Also connected to and driven by one of the cams is a Geneva wheel 31.

The operation of this invention will now be described by moving the selector switch 11 from position three to position one. When selector switch 11 is moved so that the switch is selecting the function associated with the contact number one, the positive direct current voltage from source 13 is applied to the relay 14 through the function seeking switch 12. A voltage will cause a current to flow in the circuit including the source of voltage 13, the center contact of the seeking switch 12, contact number one on seeking switch 12, and contact number one on selection switch 11 through the arm of number one on selection switch 11 through the winding on the relay 14 to ground. This current flow energizes the relay 14. When relay 14 is energized, the contact arms 14a, 14b and 14c are moved to the lower fixed contacts.

When the relay 14 is energized and the contact arms are in the lower position, the positive voltage from source 13 is applied to motor 15 through a circuit including contact arm 14b, the motor 15, contact arm 14c and ground. The motor 15 thus begins to turn and in so doing applies power to the differential 22. Shaft 24 is locked against rotation by the co-action between pawl 29 and cam 26 and therefore the differential 22 drives the unrestrained shaft 23 in a counterclockwise direction. At the time that shaft 23 is being driven counterclockwise, shaft 24 is locked by pawl 29 and cam 25 in the detent on cam 26. Shaft 23 in rotating drives cams 25 and 30 in a counterclockwise direction. As cam 25 commences rotation, pawl 27 is lifted out of the notch on cam 25 and actuates switch 18. It is obvious that the notches in the cams and the faces on the pawl are configured so that the cams will rotate in one direction and force the pawl out while it will be locked if rotation is in the opposite direction. The closing switch 18 connects one side of switch 18 to ground through resistance 45 and the contact arm 14c. However no current flows through switch 18 at this time because contact arm 14a is at its lower position and the other side of switch 18 is therefore open.

Cams 25 and 30 now continue to rotate in a counterclockwise direction until pawl 28 drops in the notch on cam 30. When pawl 28 drops into the notch on cam 30 it opens the switch 19 and closes the switch 20. The switch 19 is connected to the lower contacts associated with relay contact arm 14a and with the rotor of selector switch 11 so that the voltage from the B plus source 13 is applied through switch 19 to the selection switch arm of function selector switch 11 as well as to one side of the switch 17. The other side of switch 17 is connected to the positive voltage source 13 so that the switch 17 is the open contact at this time.

With shaft 23 held fixed by the action of pawl 28 and the notch on cam 30, the potentiometer 16 which is driven by shaft 23 is at one of the limit stops. With shaft 23 stopped at this position, the second notch b on cam 25 is aligned with the communicating dog on pawl 29 and thus allows cam 26 to be unlocked. With cam 26 unlocked by the action of pawl 29, shaft 24 is now free to rotate and rotates in a clockwise direction driven by the differential 22 and associated gearing. The gearing used to drive these shafts is well known in the art and any modification of the gearing shown herein may be made by persons skilled in the art without affecting the scope of this invention. Therefore, the gearing mechanisms are not described in detail.

The Geneva wheel 31 is driven by the Geneva driver 41 which is a part of cam 26 so that for each revolution of cam 26 the Geneva wheel 31 is advanced one notch in a clockwise direction. The Geneva wheel and its associated shaft drive the rotatable member of seeking switch 12 until the open position or notch on the movable portion of the seeking switch 12 is opposite the selected position as determined by the function selector switch 11. At this time the movable portion of switch 12 is held by a clutch means which is well known in the art and will not be described herein. The Geneva driver 41 continues to rotate clockwise until pawl 29 again engages the notch in cam 26. When pawl 29 falls into the notch in cam 26 the relay holding circuit including switch 17, which is actuated by pawl 29, is opened. This occurs when seeking switch 12 is correctly aligned with the chosen position since one circuit to the relay 14 includes the seeking switch 12.

When relay 14 is de-energized, a reverse voltage is applied to the motor 15 through a circuit including the contact arm 14a, the switch 18 and the motor 15, the contact arm 14c, and ground. This voltage is applied in the opposite polarity to that which was originally applied to motor 15. Motor 15 now rotates in the reverse direction. This reverse voltage may be reduced by voltage dividers to make the subsequent fade time larger than the fade time which has just been described. This means that the time taken to drive the potentiometer 16 back to its "home" or starting position will be longer than the time it takes to drive the potentiometer from the starting to the switching position. The reverse direction of the motor causes pawl 29 to lock shaft 24 against normal counterclockwise rotation due to the configuration of the pawl and the notch in the cam 26. The power from the motor is therefore applied through the differential 22 to rotate the unrestrained shaft 23 in a clockwise direction. As shaft 23 rotates in a clockwise direction, the potentiometer 16 is driven in a positive manner and applies a predetermined resistance into the control circuit not shown. The shaft 23 will continue to rotate until pawl 27 drops into the first notch a on cam 25. When pawl 27 drops into the first notch a on cam 25, switch 18 is opened by this motion of the pawl and the voltage source is thus removed from the motor 15.

In operation, as the present invention might be incorporated in an aircraft control system, the controlled element shown as potentiometer 16 might be connected through connector 52 to a signal selecting switch indicated by reference numeral 11a. The rotor of selector switch 11a would be operably connected to the rotor of seeking switch 12 to be selectively connected to one of a plurality of signal carrying contacts 55 in accordance with the selected position of the selected switch 11. Each of the fixed contacts 55 of switch 11a might in accordance with a particular automatic flight control system be connected to a command signal source peculiar to the operational modes selected by positions 1–4 of switch 11. The selected signal is applied through controlled potentiometer 16, the wiper arm 51 of which might carry a predetermined portion of this signal through a holding relay means 56 to a utilization device or control member 57. Control member 57 might then represent a control surface channel of the automatic flight control system. Holding relay 56 might then provide an open circuit for the signal taken from the potentiometer wiper arm 51 to prevent the passage of control signal therethrough to the control member 57. As previously discussed, switch 20 is momentarily closed after potentiometer 51 is faded to the zero gain position and, upon the closing of switch 20, the holding relay 56 might be energized to effect and hold a connection between the output from potentiometer 16 to the control member 57 upon the closure of switch 20. Thus with the fading and switching system of the present invention a sequence is initiated upon selection of an operating mode as determined by positioning of selector switch 11 to fade the initial control signal to zero; then engage the newly selected control signal to the control member and finally to bring the gain or the application of the newly selected control signal back up to a normal value.

The fading feature of this invention may be utilized without switching the function selection switch 11 to a different function. This fading would be especially useful for engaging an automatic pilot system in the function which has been pre-selected and which is still desirable. To perform this engaging function it is necessary to place a momentary switch 40 between the B plus source 13 and the relay 14. Upon momentary closure of switch 40, and fading cycle which has been described above would be repeated.

Although this invention has been described with respect to a particular embodiment thereof, it is not to be so limited as changes and modifications may be made therein which are within the full intended scope of the invention as defined by the appended claims.

What is claimed is:

1. A shaft positioning system for sequentially effecting a predetermined rotation of a shaft member from an initial position, and a reverse rotation thereof to said initial position; comprising a source of direct-current voltage, a relay including a plurality of contacts, switching means, said relay operably connected through said switching means to said source of direct-current voltage, a second normally closed switch serially connected with certain ones of said relay contacts between said source of direct-current voltage and said relay to hold a connection between said direct-current source and said relay upon initial closing of said switching means, motor means, said switching means operably effecting connection of said source of direct-current voltage through said relay contacts to said motor means to effect a first direction of rotation thereof, a differential gear means, said motor means driving said differential gear means, first and second shafts driven by said differential gear means, first and second notched cams operably connected to said first shaft, a third notched cam operably connected to said second shaft, first and second pivoted pawl members communicating with said first and second cams respectively, a third centrally pivoted pawl member having first and second notch-engaging ends thereof communicating with said second and third cams respectively, said first switch being selectively operated by said first pawl member, second and third switches selectively operated by said second and third pawl members respectively, said second switch being serially connected between said motor means and said direct-current source through certain ones of said relay contacts to selectively effect a second direction of rotation of said motor, said third switch shunting said first switch, said cam means and pawl means and associated first, second, and third switches being adapted upon closing of said switching means so sequentially effect a predetermined rotation of said first shaft from said initial position with simultaneous restraint of said second shaft, a predetermined rotation of said second shaft with simultaneous restraint of said first shaft, and a reverse rotation of said first shaft to said initial position with simultaneous restraint of said second shaft.

2. A positioning system as defined in claim 1 further including a fourth switch operated by said first pawl and adapted to be closed thereby as said first switch is simultaneously opened, a potentiometer operably connected to said first shaft, a controlled signal source connected to said potentiometer whereby sequentially the signal output from said potentiometer is faded from a maximum value to a minimum value, said fourth switch is momentarily closed and the output from said potentiometer is faded back to said maximum value, a signal utilization means, signal engaging means, said signal engaging means operated by said fourth switch to effect and hold a connection between said potentiometer output and said signal utilization means upon said fourth switch being closed.

3. A fading device as described in claim 1 wherein said switching means comprises a momentary switch serially connected between said direct-current source and said relay.

4. A device as described in claim 1 wherein said switch means comprises an open seeking switch, said open seeking switch including a rotor and a plurality of circumferentially disposed stator contacts in peripheral engagement therewith, a function selecting switch including a plurality of fixed contacts each connected individually to one of said seeking switch stator contacts and a rotor contact connected to said relay, the rotor of said seeking switch connected to said source of direct-current voltage; means for positioning said seeking switch rotor in relationship to the selected position of said function selecting switch, said positioning means comprising a Geneva wheel means operably connected to and positioned in response to rotation of said third cam whereby said sequence of shaft rotations may be initiated by operation of said function selector switch.

5. A device as described in claim 1 wherein said switching means further comprises an open seeking switch, said open seeking switch including a notched rotor and a plurality of circumferentially disposed stator contacts in peripheral engagement therewith, a function selecting switch including a plurality of fixed contacts each connected individually to one of said seeking switch stator contacts and a rotor contact connected to said relay, the rotor of said seeking switch connected to said source of direct-current voltage; means for positioning said seeking switch rotor in relationship to the selected position of said function selecting switch, said positioning means comprising a Geneva wheel means operably connected to and positioned in response to rotation of said third cam whereby said sequence of shaft rotations may be initiated by operation of said function selector switch and may be additionally initiated without operation of said function selection switch by the closing of said momentary switch.

6. A fading and switching unit for sequentially effecting a predetermined rotation of a positioned member from an initial position, a closing of a controlled switch and a reverse rotation of said switch of said positioned member to said initial position; comprising a source of direct-current voltage, a relay including a plurality of contacts, switching means, said relay operably connected through said switching means to said source of direct-current voltage, a second normally closed switch serially connected with said relay contacts between said source of direct-current voltage and said relay to hold a connection between said direct-current source and said relay upon initial closing of said switching means, motor means, said motor means operably connected to said source of direct-current voltage through certain ones of said relay contacts to effect a first direction of rotation thereof, a differential gear means, said motor means driving said differential gear means, first and second shafts driven by said differential gear means, first and second notched cams operably connected to said first shaft, a third notched cam operably connected to said second shaft, first and second pawl members communicating with said first and second cams respectively, a third centrally pivoted pawl having first and second notch-engaging ends thereof communicating with said second and third cams respectively, said first switch being selectively operated by said first pawl member, second and third switches selectively operated by said second and third pawl members respectively, said second switch being serially connected between said motor means and said direct-current source through said relay contacts to selectively effect a second direction of rotation of said motor, said third switch shunting said first switch, said cam means and said pawl means and associated first, second, and third switches being adapted such that upon initial closing of said relay means said motor means and differential means effect a predetermined rotation of said first shaft with said second shaft being restrained by co-action between said third pawl member and said second and third cams respectively, said predetermined rotation of said first shaft being limited by subsequent co-action between said first pawl and said first cam with simultaneous removal of restraining co-action between said second shaft by said third pawl means and connection of said direct-current source to said relay through said third switch, said differential thereby imparting a predetermined rotation to said second shaft with simultaneous restraint of said first shaft, the predetermined rotation of said second shaft being limited by co-action between said third pawl and third cam whereupon simultaneously said third switch is opened to remove said direct-current source connection through said relay contacts to said motor and said direct-current source is connected through said relay contacts and said second switch to said motor to effect a second direction of rotation thereof, said second direction of rotation of said motor being imparted through said differential means to effect reverse rotation of said second shaft with simultaneous restraint of said first shaft by co-action between said third pawl and said third cam, said reverse rotation of said first shaft being limited by co-action between said first pawl means and said first cam, said second switch being open at said limit of reverse rotation of said first shaft to remove the connection of said direct-current source to said motor means, said controlled switch operably communicating with said first pawl whereby said controlled switch is closed simultaneously with the opening of said first switch, and said positioned member being operably connected to said first shaft.

References Cited in the file of this patent
UNITED STATES PATENTS
2,409,895    Phelps  ---------------- Oct. 22, 1946